United States Patent

Mink et al.

[11] Patent Number: 5,882,750
[45] Date of Patent: Mar. 16, 1999

[54] SINGLE REACTOR BIMODAL HMW-HDPE FILM RESIN WITH IMPROVED BUBBLE STABILITY

[75] Inventors: Robert I. Mink, Warren; Thomas E. Nowlin, West Windor; Sandra D. Schregenberger, Neshanic; Pradeep P. Shirodkar, Belle Mead; Grace O. Tsien, Colonia, all of N.J.

[73] Assignee: Mobil Oil Corporation, Fairfax, Va.

[21] Appl. No.: 497,991

[22] Filed: Jul. 3, 1995

[51] Int. Cl.⁶ .................................................. C08L 23/00
[52] U.S. Cl. .......................................... 428/35.7; 525/240
[58] Field of Search ..................... 502/113, 119, 502/120, 111, 104, 115; 525/240; 428/35.7, 402

[56] References Cited

U.S. PATENT DOCUMENTS

| | | | |
|---|---|---|---|
| 3,135,809 | 6/1964 | Bosmajian | 260/650 |
| 3,242,099 | 3/1966 | Manyik | 252/429 |
| 3,950,269 | 4/1976 | Setterquist | 252/430 |
| 4,048,412 | 9/1977 | Caumartin et al. | 526/65 |
| 4,188,470 | 2/1980 | Collina et al. | 526/64 |
| 4,307,209 | 12/1981 | Morita et al. | 525/246 |
| 4,324,691 | 4/1982 | Hartshorn et al. | 252/429 B |
| 4,329,252 | 5/1982 | Gavens et al. | 252/429 B |
| 4,336,352 | 6/1982 | Sakurai et al. | 525/240 |
| 4,338,424 | 7/1982 | Morita et al. | 526/65 |
| 4,352,915 | 10/1982 | Mashita et al. | 526/65 |
| 4,390,669 | 6/1983 | Morita et al. | 526/65 |
| 4,402,861 | 9/1983 | Hoff | 252/429 B |
| 4,404,344 | 9/1983 | Sinn et al. | 526/160 |
| 4,414,369 | 11/1983 | Kuroda et al. | 526/65 |
| 4,420,592 | 12/1983 | Kato et al. | 526/65 |
| 4,446,288 | 5/1984 | Hoff | 526/129 |
| 4,461,873 | 7/1984 | Bailey | 525/240 |
| 4,481,301 | 11/1984 | Nowlin et al. | 502/104 |
| 4,481,302 | 11/1984 | McDaniel et al. | 502/150 |
| 4,525,322 | 6/1985 | Page et al. | 264/531 |

(List continued on next page.)

FOREIGN PATENT DOCUMENTS

| | | |
|---|---|---|
| 0 369 436 | 5/1990 | European Pat. Off. . |
| 0 515 132 | 11/1992 | European Pat. Off. . |
| 0 516 458 | 12/1992 | European Pat. Off. . |
| 59 179 507 | 10/1984 | Japan . |
| 59 179 508 | 10/1984 | Japan . |

OTHER PUBLICATIONS

Kaminsky, Water, "Living Polymers" on Polymerization with Extremely Productive Ziegler Catalysts, Agnew. Chem. Int., pp. 390–392, (1980).

Kaminsky, Water, Influence of hydrogen on the polymerization of ethylene with the homogeneous Ziegler System bis(cyclopentadienyl)zirconiumdichloride/aluminoxane, Makromol. Chem., pp. 225–228, (1984).

Kaminsky, Walter, "Bis(cyclopentadienyl)zirkon– Verbindungen und Aluminoxan als Ziegler–Katalysatoren fur die Polymerization und Copolymerisation von Olefinen", Makromol. Chem., pp. 417–421 (1983).

Kaminsky, Walter, "Isotactic polymerization of propene with (n–1,1'–ethylenedi–4,5,6,7–tetrahydroindenyl)zirconium dichloride combined with methylaluminoxane", Makromol. Chem., pp. 305–310, (1987).

Kaminsky, W., "Metallocene Catalysts", Universatat Hamburg, (1992).

1980 Dissertation of Andresen with Translation, "UV spektroskopische Untersuchungen . . . als Katalysatorkomphohente".

1985 Dissertation of Hahnsen with Translation, "Kinetische und meachanistische . . . und Methylaluminoxan".

(List continued on next page.)

*Primary Examiner*—Charles Nold
*Attorney, Agent, or Firm*—Jessica M. Sinnott

[57] ABSTRACT

Single reactor bimodal MWD high molecular weight polyethylene film resin has improved bubble stability. The bimodal molecular weight distribution resin has low resin elasticity. Preferably the resin is made catalytically in one reactor. The preferred catalyst appears to control the properties of bubble stability and elasticity.

41 Claims, 1 Drawing Sheet

U.S. PATENT DOCUMENTS

| | | | |
|---|---|---|---|
| 4,525,550 | 6/1985 | Warzelhan et al. | 526/116 |
| 4,530,914 | 7/1985 | Ewen et al. | 502/113 |
| 4,536,484 | 8/1985 | Lacombe et al. | 502/62 |
| 4,542,199 | 9/1985 | Kaminsky et al. | 526/160 |
| 4,547,551 | 10/1985 | Bailey et al. | 525/240 |
| 4,568,659 | 2/1986 | Warzelhan et al. | 502/111 |
| 4,578,373 | 3/1986 | Graves | 502/113 |
| 4,603,173 | 7/1986 | Mack et al. | 525/194 |
| 4,658,078 | 4/1987 | Slaugh et al. | 585/512 |
| 4,665,047 | 5/1987 | Slaugh et al. | 502/108 |
| 4,701,432 | 10/1987 | Welborn, Jr. | 502/113 |
| 4,703,094 | 10/1987 | Raufast | 526/65 |
| 4,707,530 | 11/1987 | Johnson | 526/129 |
| 4,710,522 | 12/1987 | Bachl et al. | 526/116 |
| 4,752,597 | 6/1988 | Turner | 502/104 |
| 4,769,510 | 9/1988 | Kaminsky et al. | 585/512 |
| 4,794,096 | 12/1988 | Ewen | 502/117 |
| 4,808,561 | 2/1989 | Welborn, Jr. | 502/114 |
| 4,814,540 | 3/1989 | Watanabe et al. | 585/523 |
| 4,820,786 | 4/1989 | Bacskai | 526/152 |
| 4,871,704 | 10/1989 | Kohara et al. | 502/114 |
| 4,874,734 | 10/1989 | Kioka et al. | 502/104 |
| 4,888,318 | 12/1989 | Allen et al. | 502/105 |
| 4,897,455 | 1/1990 | Welborn, Jr. | 526/129 |
| 4,910,272 | 3/1990 | Marchand et al. | 526/129 |
| 4,912,075 | 3/1990 | Chang | 502/107 |
| 4,914,253 | 4/1990 | Chang | 585/523 |
| 4,918,038 | 4/1990 | Samueli et al. | 502/112 |
| 4,923,883 | 5/1990 | Kioka et al. | 502/9 |
| 4,925,821 | 5/1990 | Chang | 502/107 |
| 4,931,517 | 6/1990 | Fujita | 526/128 |
| 4,933,403 | 6/1990 | Kaminsky et al. | 526/160 |
| 4,935,397 | 6/1990 | Chang | 502/117 |
| 4,937,217 | 6/1990 | Chang | 502/111 |
| 4,937,301 | 6/1990 | Chang | 526/128 |
| 4,952,540 | 8/1990 | Kioka et al. | 502/9 |
| 4,962,248 | 10/1990 | Winter et al. | 585/12 |
| 4,962,262 | 10/1990 | Winter et al. | 585/512 |
| 4,975,485 | 12/1990 | Sato et al. | 525/53 |
| 4,980,330 | 12/1990 | Marchand et al. | 502/115 |
| 5,001,205 | 3/1991 | Hoel | 526/128 |
| 5,006,500 | 4/1991 | Chang | 502/107 |
| 5,008,228 | 4/1991 | Chang | 502/111 |
| 5,023,388 | 6/1991 | Luker | 585/9 |
| 5,026,797 | 6/1991 | Takahashi | 526/124 |
| 5,032,562 | 7/1991 | Loetal | 502/111 |
| 5,043,515 | 8/1991 | Slaugh et al. | 585/512 |
| 5,047,468 | 9/1991 | Lee et al. | 525/53 |
| 5,055,438 | 10/1991 | Canich | 502/117 |
| 5,057,475 | 10/1991 | Canich et al. | 502/104 |
| 5,066,631 | 11/1991 | Sangokoya et al. | 502/152 |
| 5,077,255 | 12/1991 | Welborn, Jr. | 502/104 |
| 5,086,024 | 2/1992 | Crapo et al. | 502/117 |
| 5,086,135 | 2/1992 | Kissin | 526/151 |
| 5,087,788 | 2/1992 | Wu | 585/512 |
| 5,091,352 | 2/1992 | Kioka et al. | 502/103 |
| 5,122,491 | 6/1992 | Kioka et al. | 502/117 |
| 5,126,301 | 6/1992 | Tsutsui et al. | 502/108 |
| 5,126,303 | 6/1992 | Resconi et al. | 502/117 |
| 5,126,398 | 6/1992 | Lee et al. | 525/53 |
| 5,132,262 | 7/1992 | Rieger et al. | 502/117 |
| 5,132,381 | 7/1992 | Winter et al. | 526/160 |
| 5,145,819 | 9/1992 | Winter et al. | 502/117 |
| 5,147,949 | 9/1992 | Chang | 526/129 |
| 5,157,008 | 10/1992 | Sangokoya et al. | 502/111 |
| 5,162,278 | 11/1992 | Razavi | 502/152 |
| 5,171,799 | 12/1992 | Kioka et al. | 26/127 |
| 5,171,871 | 12/1992 | Miyashita | 556/27 |
| 5,171,919 | 12/1992 | Watanabe et al. | 585/523 |
| 5,173,464 | 12/1992 | Pettijohn et al. | 502/104 |
| 5,196,496 | 3/1993 | Galimberti et al. | 526/348.6 |
| 5,198,399 | 3/1993 | Hoff et al. | 502/111 |
| 5,206,197 | 4/1993 | Campbell, Jr. | 502/103 |
| 5,206,199 | 4/1993 | Kioka et al. | 502/117 |
| 5,208,304 | 5/1993 | Waymouth | 526/164 |
| 5,216,095 | 6/1993 | Dolle et al. | 526/127 |
| 5,223,465 | 6/1993 | Ueki et al. | 502/117 |
| 5,225,500 | 7/1993 | Elder et al. | 526/127 |
| 5,234,878 | 8/1993 | Tsutsui et al. | 502/103 |
| 5,238,891 | 8/1993 | Miro | 502/104 |
| 5,238,892 | 8/1993 | Chang | 502/111 |
| 5,240,894 | 8/1993 | Burkhardt et al. | 502/108 |
| 5,241,025 | 8/1993 | Hlatky et al. | 526/129 |
| 5,262,876 | 11/1993 | Shamshoum et al. | 502/113 |
| 5,281,679 | 1/1994 | Jejelowo et al. | 526/114 |
| 5,304,523 | 4/1994 | Razavi | 502/152 |
| 5,324,800 | 6/1994 | Welborn, Jr. et al. | 526/160 |
| 5,332,706 | 7/1994 | Nowlin et al. | 502/107 |
| 5,359,015 | 10/1994 | Jejelowo | 526/114 |

OTHER PUBLICATIONS

1985 Dissertation of Kulper with Translation, "Polymerisationsverhalten von loslichen, . . . gegenuber 1–Olefinen".

1981 Dissertation of Kulper with Translation, "Homogene, Chlorhaltige . . . –von $(CpMe_5)_2$. . . von $Cp_2ZrCl_2$. . . von Ethen".

*FIG. 1*

SINGLE REACTOR BIMODAL HMW-HDPE FILM RESIN WITH IMPROVED BUBBLE STABILITY

FIELD OF THE INVENTION

Bimodal molecular weight distribution high molecular weight ethylene homopolymers and copolymers produced in a single reactor exhibit excellent bubble stability, in upstream processing in high stalk extrusion equipment. The improved bubble stability is correlated herein to lower resin elasticity. These properties are, in turn, attributable to catalysts used to make the ethylene homopolymers and copolymers.

BACKGROUND OF THE INVENTION

Increasing the molecular weight of polyethylene (and copolymers of ethylene) generally results in enhancing tensile strength, ultimate elongation, impact strength, puncture resistance, and toughness, of films produced therefrom. However, increasing the molecular weight of the polyethylene will usually decrease its processability. By providing a mixture of a high molecular weight polyethylene with a lower molecular weight polyethylene, the desirable characteristics due to the high molecular weight component can be retained while improving processability of the mixture containing the high molecular weight component. To produce such mixtures, various alternatives are being considered, including post reactor or melt blending, catalysis in a single reactor with a catalyst effective to produce such a product and lastly use of multistage reactors, in which diverse average molecular weight components can be produced in each reactor. In accordance with the invention, the bubble stability of resins produced far surpass those produced by other mixed metal catalyst(s).

SUMMARY OF THE INVENTION

In accordance with the invention, a resin of broad or bimodal molecular weight distribution has been produced catalytically in a single reactor. Moreover, improvement in bubble stability of the resin during film production over other bimodal molecular weight resins has been attributed to the new resins herein. This improvement in bubble stability has been correlated to resin elasticity; and each property appears to be catalyst controlled.

DETAILED DESCRIPTION OF THE INVENTION

In accordance with the invention, resins of broad or bimodal molecular weight distribution have been produced in a single reactor; these may be ethylene polymers and/or copolymers. By the phrase "bimodal molecular weight distribution" we mean two components of different molecular weights, accordingly one having a higher relative molecular weight than the other of the two components. Improvement in bubble stability of the resin during film production over other bimodal molecular weight resins has been attributed to the new resins herein. The resins which are processed on high stalk extrusion lines exhibit excellent bubble stability, a prerequisite to being processed on those lines. This improvement in bubble stability has been correlated to resin elasticity; and each property appears to be directly a result of the catalyst used to make them.

The resin of this invention may be either 1) a homopolymer of ethylene; 2) at least one copolymer of a preponderance i.e., greater than 50 wt. % of ethylene with a minor amount of a 1-olefin containing 3 to about 10 carbon atoms, preferably a 1-olefin containing 4 to about 10 carbon atoms, e.g., 1-butene, 1-pentene, 1-hexene, 4-methyl-1pentene, 1-octene, 1-decene, and mixtures thereof; or 3) a mixture of any of the foregoing polymers. In general, the polymer product will comprise an amount of polymerized comonomer which is in the range, for example, of about 0 to 30 weight percent, based on the total weight of polymer.

The resins produced herein have a density (measured by ASTM D 1505) in the range of 0.89 to 0.970. The resins which can be produced in accordance with the invention can exhibit densities of high density, medium density or low density resins, respectively. Accordingly, the resins can be produced which exhibit specific density in the range of 0.89 to 0.929 [low density], 0.930 to 0.940 [medium density], and 0.940 to 0.970 [high density.]

The resins of the invention exhibit a characteristic elasticity. It is believed that the elasticity of the products we produce is a critical factor in determining the bubble stability of HMW resins. We measure bubble stability in terms of our ability to make thin films (1 mil) at (120 lbs/hr) commercial output rates. When the resin has high elasticity any small disturbances during film blowing are amplified resulting in an uncontrollable process. The combination of low elasticity and high viscosity of the invention resins allows disturbances during film blowing to be effectively damped out.

The dynamic elasticity of the polymer product of the invention is no higher than about 0.65 at 0.1 rad./sec. at a corresponding complex viscosity of no higher than about 20E5 (20×10$^5$ poises) at 0.1 rad./sec., preferably about 0.45 to 0.58 at a corresponding complex viscosity of about 6E5 to 20E5, and most preferably about 0.45 to 0.52 at a corresponding complex viscosity of about 7E5 to 14E5.

The dynamic elasticity as used herein is defined as the ratio of the storage modulus G' (w) to the loss modulus G" (w). The storage modulus G' (w), and the complex viscosity are defined in ASTM D 4440-84. The properties were measured accordingly at 200° C.

The resins of the invention comprise a HMW component and a LMW component with a high molecular weight (HMW) component weight fraction which is greater than 0 (zero). Generally, the HMW component weight fraction can be controlled within a very broad range, while maintaining excellent properties in ultimate applications, such as film production. The weight fraction of HMW component can range from 0.01 to 0.99, preferably from 0.4 to 0.7 and most preferably from 0.5 to 0.6. The resin has a molecular weight distribution, which is characterized as MFR or Mw/Mn. The MFR of resin products of the invention can range from 20 to 300, preferably from 60 to 200, and most preferably from 80 to 150. The Mw/Mn of resin products of the invention can range from 2.5 to 60, preferably from 10 to 40, and most preferably from 15 to 30.

The low molecular weight component of resin product of the invention is much narrower in molecular weight distribution, than that produced by a conventional Ziegler Natta catalyst containing only one transition metal such as titanium and/or that produced by a conventional tandem two-reactor process. The narrow MWD of the LMW component is a result of the single site metallocene catalyst component. This narrower molecular weight distribution of the low molecular weight component of the resin of the invention may be responsible for the reduced tendency towards die-lip buildup and smoking because of the absence of very low molecular weight tails. In preferred embodiments, the $M_w/M_n$ of the low molecular weight component is less than 3 whereas the high molecular weight component is characterized by $M_w/M_n$ greater than 3. That narrower distribution also enables production of much lower molecular weight component, as the LMW component, without encountering the die-lip buildup problem.

The compositions of the invention can be extruded into pipes and injection or blow molded into articles or extruded and blown into films. Films can be produced which are 0.2 to 10.0 mils, preferably 0.5 to 2.0 mils, thickness. For commercial applications, blown films preferably have an FQR value of less than 50; FQR (film quality rating) relates to film gels. Lower FQR values reflect lower gels and thus are preferred. Blow molded articles include bottles, containers, fuel tanks and drums.

For film production, the products may contain any of various additives conventionally added to polymer compositions such as lubricants, microtalc, stabilizer, antioxidants, compatibilizers, pigments, etc. These reagents can be employed to stabilize the products against oxidation. For example, additive packages comprising 400–1200 ppm hindered phenol(s); 200–2000 ppm phosphites; 250 to 1000 ppm antistats and 250–2000 ppm stearates, for addition to the resin powders, can be used for pelletization. The polymers can be added directly to a blown film extruder, e.g., an Alpine extruder, to produce films having a thickness, for example of about 0.2 to 5 mils.

The following Examples further illustrate the essential features of the invention. However, it will be apparent to those skilled in the art that the specific reactants and reaction conditions used in the Examples do not limit the scope of the invention.

The properties of the polymers produced in the Examples were determined by the following test methods:

| | |
|---|---|
| Density | ASTM D-1505 - a plaque is made and conditioned for one hour at 100° C. to approach equilibrium crystallinity. Measurement for density is then made in a density gradient column; reported as gms/cc. |
| Melt Index (MI), $I_2$ | ASTM D-1238 - (190° C./2160 g) Measured at 190° C. - reported as grams per 10 minutes. |
| High Load Melt Index (HLMI), $I_{21}$ or FI | ASTM D-1238 - (190° C./21600 g) Measured at 10 times the weight used in the melt index test above. |
| Melt Flow Ratio (MFR) | $\dfrac{I_{21}}{I_2}$ |

The ethylene polymer product of this invention is capable of being formed into thin gauge films, e.g., of up to 10 mils., of superior mechanical properties, e.g., an Elmendorf tear resistance in the machine direction (MD Tear, ASTM D1922) of at least about 10 g/mil, preferably about 15 to 60 g/mil, and more preferably about 20 to 60 g/mil, and a Dart Drop Impact resistance ($F_{50}$, ASTM D1709) of at least about 200 g, preferably about 200 to 600 g, and more preferably about 250 to 600 g.

When the resin is made with the preferred catalyst described below it will contain 0.5 to 20 ppm of transition metals. In particularly preferred embodiments described herein the resin will contain 0.1 to 10 ppm Zr and 0.5 to 10 ppm Ti. The as formed reactor product is granular and has a preferred average particle size range of 0.01–0.04 inches.

Process for Production of Resins

Preferably, the resins of the invention are made catalytically in one reactor, under reactor conditions described below. Preferably, they are made in the presence of catalyst comprising two sources of transition metal which exhibit different hydrogen response, one from the other, in polymerization of ethylene conducted in the presence of hydrogen. Preferably, the catalyst is supported and comprises 0.1–5.0 weight percent, preferably 0.3 to 3.0, and most preferably 0.5 to 1.5 wt. % of titanium and 0.05 to 1.0 wt. %, preferably 0.1 to 0.8, and most preferably 0.20 to 0.50 wt. % percent of zirconium. The preferred catalysts are described below.

In the polymerizations, the gaseous monomer feed may consist wholly of ethylene or may comprise a preponderance of ethylene and a minor amount of a comonomer such as a 1-olefin containing 3 to about 10 carbon atoms. Comonomeric 1-olefins which may be employed are, for example, 1-butene, 1-pentene, 1-hexene, 4-methyl-1-pentene, 1-octene, 1-decene, and mixtures thereof. The comonomer may be present in the monomeric compositions.

The amount of comonomer may be in the range, for example, of about 0 to 30, preferably about 0 to 20 weight percent, based on the total weight of polymer produced in the process.

Hydrogen is fed to the reactor. Hydrogen is fed to the reactor such that the molar ratio of hydrogen to ethylene ($H_2/C_2$ ratio) is, for example, up to about 0.04, preferably about 0.005 to 0.015.

The ethylene partial pressure employed in the reactor is no higher than about 250 psia, for example in the range of about 150 to 200 psia, preferably in the range of about 170 to 190 psia.

If desired for any purpose, e.g., to control superficial gas velocity or to absorb heat of reaction, an inert gas such as nitrogen may also be present in one or both reactors in addition to the monomer and hydrogen. Thus the total pressure in both reactors may be in the range, for example, of about 100 to 600 psig, preferably about 200 to 350 psig.

The temperature of polymerization in the reactor may be in the range, for example, of about 60° to 130° C., preferably about 70° to 100° C. The residence time of the catalyst in the reactor is about 1 to 8 hours, preferably about 2 to 4 hours in the reactor.

The productivity of the process in the reactor in terms of grams of polymer per gram of catalyst, may be in the range, for example, of about 1,000 to 10,000 g/g, preferably about 1,500 to 8,000 g/g; The foregoing ranges are based on analysis of residual catalyst metals in the resin product.

The amount of cocatalyst utilized together with the preferred catalyst employed in the process of making the products of this invention whether for pre-reduction or activation of the catalyst prior to polymerization or added to the reactor is generally in the range, for example, of about 0 to 100 gram atoms of cocatalyst metal, e.g., aluminum, per gram atom of transition metal, e.g., titanium, preferably about 5 to 50 gram atoms of cocatalyst metal per gram atom of transition metal.

The catalysts, preferred at this time, for producing the bimodal molecular weight distribution resins of the invention, are made in accordance with the Ser. No. 08/151, 664 filed Nov. 15, 1993 and are described here:

Catalyst Composition

Catalysts which contain at least two transition metals, one in the form of a metallocene and one transition metal in the form of a non-metallocene, have an activity of at least about 1000 g polymer/g catalyst or about 100 kg polymer/g of each transition metal.

The catalysts of the invention comprise a cocatalyst comprising an aluminum alkyl compound, such as a trialkyl aluminum, free of alumoxane and free of water, or oxygen-containing oligomers and polymers of the aluminum alkyl compound, and a catalyst precursor comprising a carrier, an alumoxane and at least one metallocene; in one embodiment the catalysts further include a non-metallocene transition metal source.

The carrier material is a solid, particulate, porous, preferably inorganic material, such as an oxide of silicon and/or of aluminum. The carrier material is used in the form of a dry powder having an average particle size of from about 1 micron to about 500 microns, preferably from about 10 microns to about 250 microns. The surface area of the carrier is at least about 3 square meters per gram ($m^2/g$), and preferably at least about 50 $m^2/g$ up to about 350 $m^2/g$. The carrier material should be dry, that is, free of absorbed water. Drying of the carrier material can be effected by heating at about 100° C. to about 1000° C., preferably at about 600° C. When the carrier is silica, it is heated to at least 200° C., preferably about 200° C. to about 850° C. and most preferably at about 600° C. The carrier material must have at least some active hydroxyl (OH) groups to produce the catalyst composition of this invention.

In the most preferred embodiment, the carrier is silica which, prior to the use thereof in the first catalyst synthesis step, has been dehydrated by fluidizing it with nitrogen and heating at about 600° C. for about 16 hours to achieve a surface hydroxyl group concentration of about 0.7 millimoles per gram (mmols/g). The silica of the most preferred embodiment is a high surface area, amorphous silica (surface area=300 $m^2/g$; pore volume of about 1.65 $cm^3/g$), and it is a material marketed under the tradenames of Davison 952 or Davison 955 by the Davison Chemical Division of W. R. Grace and Company. The silica is in the form of spherical particles, e.g., as obtained by a spray-drying process. As procured, these silicas are not calcined; and this must be dehydrated, as indicated above.

The catalyst synthesis is undertaken under inert conditions, in the absence of water and of oxygen. The carrier is dispersed in solvent to form a slurry.

The carrier material, having said (OH) groups, is slurried in a non-polar solvent and the resulting slurry is contacted with at least one organomagnesium compound having the empirical formula below. The slurry of the carrier material in the solvent is prepared by introducing the carrier into the solvent, preferably while stirring, and heating the mixture to about 25 to about 70° C., preferably to about 40° to about 60° C. Temperatures here are critical with respect to the non-metallocene transition metal which is subsequently added; that is temperatures in this slurry of about 90° C. result in deactivation of the transition metal added subsequently. Accordingly, all catalyst precursor synthesis steps are conducted below 90° C. The slurry is then contacted with the aforementioned organomagnesium compound, while the heating is continued as indicated.

The organomagnesium compound has the empirical formula $R_m Mg R'_n$ where R is an alkyl of 1 to 12 carbon atoms, and generally where R and R' are the same or different $C_2$–$C_{12}$ alkyl groups, preferably $C_4$–$C_{10}$ alkyl groups, more preferably $C_4$–$C_8$ alkyl groups, and most preferably both R and R' are mostly butyl groups, and m and n are each 0, 1 or 2, providing that m+n is equal to the valence of Mg.

Suitable non-polar solvents are materials in which all of the reactants used herein, i.e., the organomagnesium compound, and the non-metallocene transition metal compound, are at least partially soluble and which are liquid at reaction temperatures. Preferred non-polar solvents are alkanes, such as isopentane, hexane, n-heptane, octane, nonane, and decane, although a variety of other materials including cycloalkanes, such as cyclohexane, aromatics, such as benzene, toluene and ethylbenzene, may also be employed. The most preferred non-polar solvent is isopentane. Prior to use, the non-polar solvent should be purified, such as by percolation through silica gel and/or molecular sieves, to remove traces of water, oxygen, polar compounds, and other materials capable of adversely affecting catalyst activity.

In the most preferred embodiment of the synthesis of this catalyst it is important to add only such an amount of the organomagnesium compound that will be deposited—physically or chemically—onto the support since any excess of the organomagnesium compound in the solution may react with other synthesis chemicals and precipitate outside of the support. The carrier drying temperature affects the number of sites on the carrier available for the organomagnesium compound—the higher the drying temperature the lower the number of sites. Thus, the exact molar ratio of the organomagnesium compound to the hydroxyl groups will vary and must be determined on a case-by-case basis to assure that only so much of the organomagnesium compound is added to the solution as will be deposited onto the support without leaving any excess of the organomagnesium compound in the solution. Furthermore, it is believed that the molar amount of the organomagnesium compound deposited onto the support is greater than the molar content of the hydroxyl groups on the support. Thus, the molar ratios given below are intended only as an approximate guideline and the exact amount of the organomagnesium compound in this embodiment must be controlled by the functional limitation discussed above, i.e., it must not be greater than that which can be deposited onto the support. If greater than that amount is added to the solvent, the excess may react with the non-metallocene transition metal compound, thereby forming a precipitate outside of the support which is detrimental in the synthesis of our catalyst and must be avoided. The amount of the organomagnesium compound which is not greater than that deposited onto the support can be determined in any conventional manner, e.g., by adding the organomagnesium compound to the slurry of the carrier in the solvent, while stirring the slurry, until the organomagnesium compound is detected as a solution in the solvent.

For example, for the silica carrier heated at about 600° C., the amount of the organomagnesium compound added to the slurry is such that the molar ratio of Mg to the hydroxyl groups (OH) on the solid carrier is about 0.5:1 to about 4:1, preferably about 0.8:1 to about 3:1, more preferably about 0.9:1 to about 2:1 and most preferably about 1:1. The organomagnesium compound dissolves in the non-polar solvent to form a solution from which the organomagnesium compound is deposited onto the carrier.

It is also possible to add such an amount of the organomagesium compound which is in excess of that which will be deposited onto the support, and then remove, e.g., by filtration and washing, any excess of the organomagnesium compound. However, this alternative is less desirable than the most preferred embodiment described above.

The organomagnesium treated support is contacted with an organic alcohol reagent (ROH) containing RO- groups which are reactive or capable of displacing alkyl groups on the magnesium. The amount of this organic alcohol reagent is effective to provide a ROH:Mg ratio of 0.5 to 2.0, preferably 0.8 to 1.5.

Contact of the silica supported magnesium compound, with the organic alcohol reagent is undertaken in the slurry. Contact is undertaken at a temperature ranging from 25° C. to 80° C., preferably 40° C. to 70° C.

The alkyl group in the organic alcohol reagent can contain 1 to 12 carbon atoms, preferably 1 to 8; in the embodiments below, it is an alkyl containing 2 to 4 carbon atoms, particularly of 4 carbon atoms (butyl). The inclusion of the alcohol reagent step in the catalyst synthesis of the invention produces a catalyst which, relative to the absence of this step, is much more active, requires much less non-transition metal (e.g. titanium), and is much more active with respect to the product component produced with the metallocene-transition metal component. In addition, the alcohol addition step is required in order to provide a final catalyst that will produce bimodal MWD resin with excellent bubble-stability during the film-forming process.

After the addition of the organic alcohol reagent to the slurry is completed, the slurry is contacted with a non-metallocene transition metal compound, free of substituted or unsubstituted cyclopentadienyl groups. The slurry temperature must be maintained at about 25 to about 70° C., preferably to about 40 to about 60° C. As noted above, temperatures in this slurry of about 80° C. or greater result in deactivation of the non-metallocene transition metal. Suitable non-metallocene transition metal compounds used herein are compounds of metals of Groups 4A, and 5A, of the Periodic Chart of the Elements, as published by Chemical and Engineering News, 63(5), 27, 1985, providing that such compounds are soluble in the non-polar solvents. Non-limiting examples of such compounds are titanium and vanadium halides, e.g., titanium tetrachloride, $TiCl_4$, vanadium tetrachloride, $VCl_4$, vanadium oxytrichloride, $VOCl_3$, titanium and vanadium alkoxides, wherein the alkoxide moiety has a branched or unbranched alkyl radical of 1 to about 20 carbon atoms, preferably 1 to about 6 carbon atoms. The preferred transition metal compounds are titanium compounds, preferably tetravalent titanium compounds. The most preferred titanium compound is titanium tetrachloride. The amount of titanium or vanadium, in non-metallocene form ranges from a Ti/Mg molar ratio of 0.3 to 1.0, preferably from 0.50 to 0.80.

Mixtures of such non-metallocene transition metal compounds may also be used and generally no restrictions are imposed on the transition metal compounds which may be included. Any transition metal compound that may be used alone may also be used in conjunction with other transition metal compounds.

After the addition of the non-metallocene transition metal compound is complete, the slurry solvent is removed by evaporation or filteringto obtain a free-flowing powder. Next, incorporation of the metallocene can be undertaken. The metallocene is activated with an alumoxane.

The metallocene compound has the formula $Cp_xMA_yB_z$ in which Cp is an unsubstituted or substituted cyclopentadienyl group, M is zirconium or hafnium and A and B belong to the group including a halogen atom, hydrogen or an alkyl group. In the above formula of the metallocene compound, the preferred transition metal atom M is zirconium. In the above formula of the metallocene compound, the Cp group is an unsubstituted, a mono- or a polysubstituted cyclopentadienyl group: and x is at least 1. The substituents on the cyclopentadienyl group can be preferably straight-chain $C_1$–$C_6$ alkyl groups. The cyclopentadienyl group can be also a part of a bicyclic or a tricyclic moiety such as indenyl, tetrahydroindenyl, fluorenyl or a partially hydrogenated fluorenyl group, as well as a part of a substituted bicyclic or tricyclic moiety. In the case when x in the above formula of the metallocene compound is equal to 2, the cyclopentadienyl groups can be also bridged by polymethylene or dialkylsilane groups, such as —$CH_2$—, —$CH_2$—$CH_2$—, —CR'R"— and —CR'R"—CR'R"— where R' and R" are short alkyl groups or hydrogen, —$Si(CH_3)_2$—, $Si(CH_3)_2$—$CH_2$—$CH_2$—$Si(CH_3)_2$— and similar bridge groups. If the A and B substituents in the above formula of the metallocene compound are halogen atoms, they belong to the group of fluorine, chlorine, bromine or iodine; and y+z is 3 or less, provided that x+y+z equals the valence of M. If the substituents A and B in the above formula of the metallocene compound are alkyl groups, they are preferably straight-chain or branched $C_1$–$C_8$ alkyl groups, such as methyl, ethyl, n-propyl, isopropyl, n-butyl, isobutyl, n-pentyl, n-hexyl or n-octyl.

Suitable metallocene compounds include bis(cyclopentadienyl)metal dihalides, bis(cyclopentadienyl)metal hydridohalides, bis(cyclopentadienyl)metal monoalkyl monohalides, bis(cyclopentadienyl)metal dialkyls and bis(indenyl)metal dihalides wherein the metal is zirconium or hafnium, halide groups are preferably chlorine and the alkyl groups are $C_1$–$C_6$ alkyls. Illustrative, but non-limiting examples of metallocenes include bis(cyclopentadienyl)zirconium dichloride, bis(cyclopentadienyl)hafnium dichloride, bis(cyclopentadienyl)zirconium dimethyl, bis(cyclopentadienyl)hafnium dimethyl, bis(cyclopentadienyl)zirconium hydridochloride, bis(cyclopentadienyl)hafnium hydridochloride, bis(n-butylcyclopentadienyl)zirconium dichloride, bis(n-butylcyclopentadienyl)hafnium dichloride, bis(n-butylcyclopentadienyl)zirconium dimethyl, bis(n-butylcyclopentadienyl)hafnium dimethyl, bis(n-butylcyclopentadienyl)zirconium hydridochloride, bis(n-butylcyclopentadienyl)hafnium hydridochloride, bis(pentamethylcyclopentadienyl)zirconium dichloride, bis(pentamethylcyclopentadienyl)hafnium dichloride, bis(n-butylcyclopentadienyl)zirconium dichloride, cyclopentadienylzirconium trichloride, bis(indenyl)zirconium dichloride, bis(4,5,6,7-tetrahydro-1-indenyl) zirconium dichloride, and ethylene-[bis(4,5,6,7-tetrahydro-1-indenyl)] zirconium dichloride. The metallocene compounds utilized within the embodiment of this art can be used as crystalline solids, as solutions in aromatic hydrocarbons or in a supported form.

The alumoxane can be impregnated into the carrier at any stage of the process of catalyst preparation. In this embodiment, the amount of Al, provided by alumoxane, is sufficientto provide an Al:transition metal (provided by metallocene) mole ratio ranging from 50 to 500, preferably 75 to 300.

The class of alumoxanes comprises oligomeric linear and/or cyclic alkylalumoxanes represented by the formula: R—(Al(R)—O)$_n$—AlR$_2$ for oligomeric, linear alumoxanes and (—Al(R)—O—)$_m$ for oligomeric cyclic alumoxane wherein n is 1–40, preferably 10–20, m is 3–40, preferably 3–20 and R is a $C_1$–$C_8$ alkyl group and preferably methyl. MAO is a mixture of oligomers with a very wide distribution of molecular weights and usually with an average molecular weight of about 1200. MAO is typically kept in solution in toluene. The MAO solutions remain liquid at fluid bed reactor temperatures.

Incorporation of the activated metallocene component onto the carrier can be accomplished in various ways. Incorporation of either or both the alumoxane and the metallocene component can be into the slurry resulting from the addition, i.e. after the addition, of the non-metallocene transition metal.

Alternatively, and in accordance with the unique method of infusion of alumoxane into the pores of the carrier, the carrier slurry can be stripped of solvent, after the addition of the non-metallocene transition metal compound, to form a free-flowing powder. The free flowing powder can then be impregnated by determining the pore volume of the carrier and providing an alumoxane (or metallocene-alumoxane) solution in a volume equal to or less than the total pore volume of the carrier, and recovering a dry catalyst precursor. The resulting free-flowing powder, referred to herein as a catalyst precursor, is combined with an activator (sometimes referred as a cocatalyst).

The volume of the solution comprising a solid alumoxane and a solvent therefor can vary. In a preferred embodiment, of alumoxane incorporation into the carrier, one of the controlling factors in the alumoxane incorporation into the carrier material catalyst synthesis is the pore volume of the silica. In this preferred embodiment, the process of impregnating the carrier material is by infusion of the alumoxane solution, without forming a slurry of the carrier material, such as silica, in the alumoxane solution. The volume of the solution of the alumoxane is sufficientto fill the pores of the carrier material without forming a slurry in which the volume of the solution exceeds the pore volume of the silica; accordingly and preferably, the maximum volume of the alumoxane solution is, does not exceed, the total pore volume of the carrier material sample. That maximum volume of the alumoxane solution insures that no slurry of silica is formed. Accordingly, if the pore volume of the carrier material is 1.65 cm$^3$/g, then the volume of alumoxane will be equal to or less than 1.65 cm$^3$/gram of carrier material. As a result of this proviso, the impregnated carrier material will appear dry immediately following impregnation although the pores of the carrier will be filled with inter alia solvent.

Solvent may be removed from the alumoxane impregnated pores of the carrier material by heating and/or under a positive pressure induced by an inert gas, such as nitrogen. If employed, the conditions in this step are controlled to reduce, if notto eliminate, agglomeration of impregnated carrier particles and/or crosslinking of the alumoxane. In this step, solvent can be removed by evaporation effected at relatively low elevated temperatures of above about 40° C. and below about 50° C. to obviate agglomeration of catalyst particles and crosslinking of the alumoxane. Although solvent can be removed by evaporation at relatively higher temperatures than that defined by the range above 40° C. and below about 50° C., short heating times schedules must be employed to obviate agglomeration of catalyst particles and crosslinking of the alumoxane.

In a preferred embodiment, the metallocene is added to the solution of the alumoxane priorto impregnating the carrier with the solution. Again, as noted above, the maximum volume of the alumoxane solution also including the metallocene is the total pore volume of the carrier material sample. The mole ratio of alumoxane provided aluminum, expressed as Al, to metallocene metal expressed as M (e.g. Zr), ranges from 50 to 500, preferably 75 to 300, and most preferably 100 to 200. An added advantage of the present invention is that this Al:Zr ratio can be directly controlled. In a preferred embodiment the alumoxane and metallocene compound are mixed together at a temperature of about 20° to 80° C., for 0.1 to 6.0 hours, prior to use in the infusion step. The solvent for the metallocene and alumoxane can be appropriate solvents, such as aromatic hydrocarbons, halogenated aromatic hydrocarbons, ethers, cyclic ethers or esters, preferably it is toluene.

The catalyst precursor component formed from the organomagnesium compound, the non-metallocene transition metal and the activated metallocene, must now be activated with a cocatalyst, which is an alkyl aluminum compound, free of water and free of oxygen-containing oligomers.

The cocatalyst can be a trialkylaluminum, free of an alumoxane. Preferably, trimethylaluminum (TMA) is the cocatalyst or activator. The amount of the TMA activator is sufficientto give a TMA:Ti molar ratio of about 10:1 to about 1000:1, preferably about 15:1 to about 300:1, and most preferably about 20:1 to about 100:1. The catalyst exhibits high activity for long periods of time, and exhibits little deactivation.

The catalyst precursor of this invention comprises a metallocene compound and an alumoxane which is fed to the fluid bed reactor for gas phase polymerizations and copolymerizations of ethylene in particulate form. Moreover, in accordance with the invention, the cocatalyst or activator is fed to the fluid bed reactor for polymerizations and copolymerizations of ethylene in the absence of alumoxane solution.

EXAMPLES (I) Catalyst Preparation

The examples of catalyst preparation are from copending application, Ser. No. 08/151664, filed Nov. 15, 1993:

The titanium component of the catalyst was prepared first and isolated as a free-flowing powder. The zirconium component of the catalyst was prepared using a "dry" impregnation method described above.

Example 1

(A) Titanium Catalyst Component Preparation. 541 grams of Davison grade 955—[600° C. calcination temperature] silica was weighed into a two-gallon stainless steel autoclave containing a stirring paddle. Next, ca. 4.8 liters of dry isopentane was added to the autoclave and the stirring rate was set at 100 rpm. The temperature of the silica/isopentane slurry was 54–58° C. Next, 546 mls of dibutylmagnesium (0.713 mmol/ml) was added to the slurry. The contents of the autoclave were stirred for 60 minutes. Then, 33.8 mls of neat 1-butanol were added and stirring was continued for one hour. Finally, 23.5 mls of titanium tetrachloride was added to the autoclave and stirring continued for 60 minutes. After this time, all solvents were removed by evaporation under a nitrogen purge. Catalyst yield was 496 grams of a tan free-flowing powder. Ti found 1.56 wt. %; Mg found 1.45 wt. %.

Example 2

Titanium/Zirconium Catalyst Preparation

Solution B: 12.95 grains of (BuCp)$_2$ZrCl$_2$ was transferred to a one-liter bottle and 687 ml of a 4.67 Molar (13.7 wt. % Al) solution of methylalumoxane were added. The bottle was shaken for about one minute to form a yellow solution which was transferred into a 1.5 liter stainless steel hoke bomb and used immediately as described below.

Under an inert atmosphere, 401 grams of the titanium-containing catalyst described above [(A) Titanium Catalyst Component Preparation] was added to a 2-gallon, glass-reactor vessel containing a helical stirrer to agitate the catalyst powder and a temperature jacket which was set at about 30° C. The stirrer was set at 125 rpm. Then, the contents of the hoke bomb (solution B) was added to the titanium-containing catalyst in approximately 5–10 ml aliquots every 30–60 seconds over a 45 minute period. The total volume of solution (B) used was such that the titanium containing catalyst always appeared "dry" during the entire addition time. However, during this addition time, the light tan titanium-containing catalyst turned a dark brown color. After the addition of solution (B) was complete, the jacket temperature was set at 45° C. and the residual toluene was removed with a nitrogen purge for 5 hrs. After this time the catalyst was a dark brown free-flowing powder. Analytical results: Mg, 0.99 wt. %; Ti, 1.14 wt. %; Al, 13.0 wt. % and Zr, 0.42 wt. %.

Example 3

Figure 1:
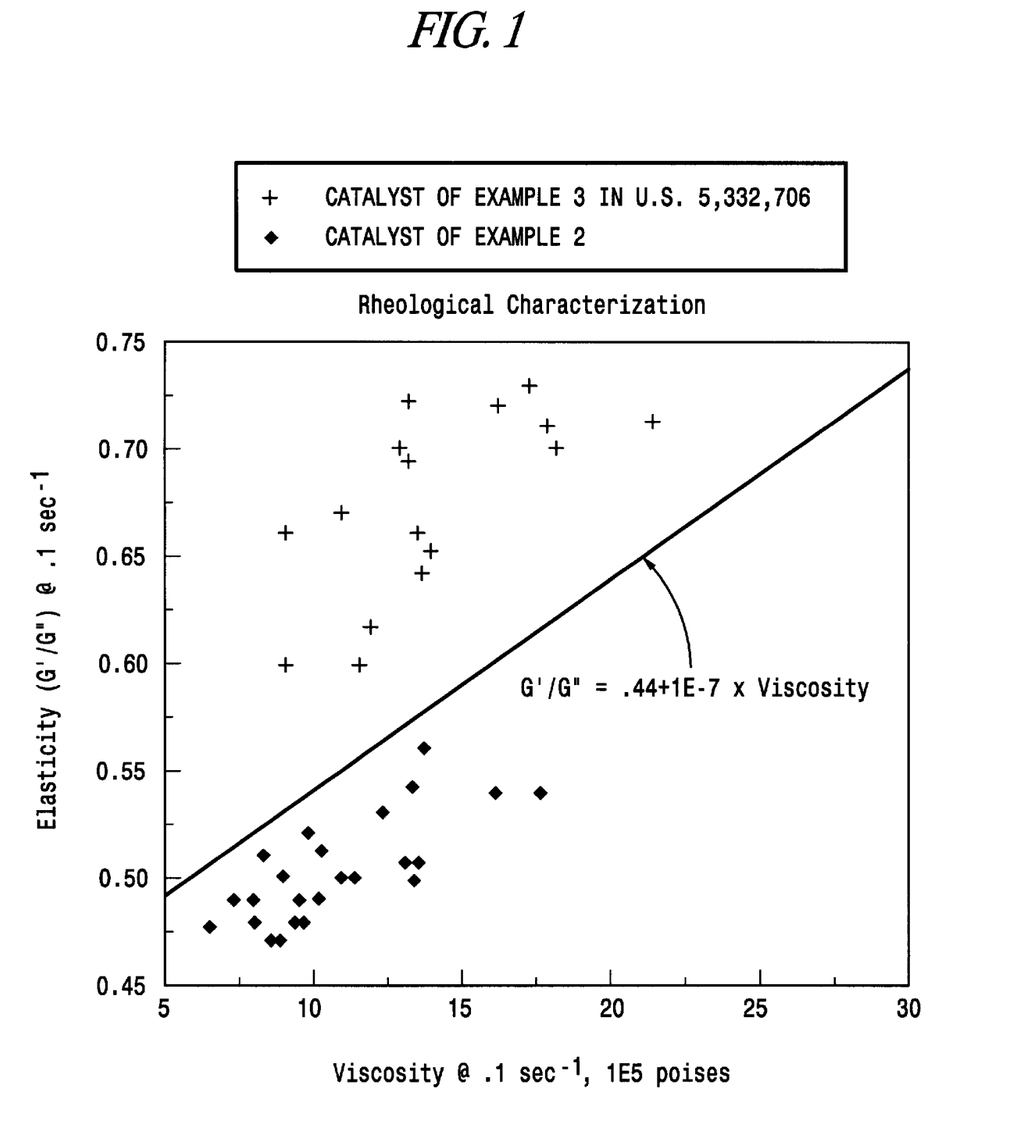
The FIGURE is a graph in which the elasticity (G'/G") is plotted against low shear viscosity (@ 0.1 sec.$^{-1}$)

A series of resins produced with the catalyst described in U.S. Pat. No. 5,332,706 (catalyst of Example 3) and the catalyst of Example 2. The resins were characterized for their dynamic rheological characteristics (viscosity and elasticity) using the RMS 800 rheometer using ASTM D44440-84. The granular resins were melt homogenized with adequate quantities of anti-oxidant before measurement were conducted at 200° C. These resins were produced under a variety of process conditions resulting in a broad range of viscosities. It is clear from the attached plot that at a given low shear viscosity (@ 0.1 sec$^{-1}$), the resins produced with the Example 2 catalyst have lower elasticity (ratio of storage modulus G' over loss modulus G" @ 0.1 sec$^{-1}$) than the corresponding resin catalyzed by the catalyst of U.S. Pat. No. 5,332,706. This difference in the elasticity is attributed to the use of a different type of the Ti catalyst component for producing the HMW component. It is apparent that the HMW component produced by the Example 2 catalyst component is narrower in MWD (lower elasticity) than that produced by the component disclosed in U.S. Pat. 5,332,706. The resin of the invention produced by the catalyst of Example 2 above can be described by the following equation:

$$\text{Elasticity } (G'/G'') @ 0.1 \text{ sec}^{-1} < 0.44 + 10^{-7} \times (\text{Viscosity } @ 0.1 \text{ sec}^{-1})$$

The lower elasticity of the resins provides a distinct advantage in terms of bubble stability as illustrated in the following example.

Example 4

In this example we compare the processability of a HMW-HDPE resin (Resin B) produced by the catalyst of Example 2 to that of the resin produced by the catalyst of Example 3 in U.S. Pat. No. 5,332,706 (Resin A). The granular resin A had an average particle size of 0.024 inch and a Ti residue of 6.3 ppm. In comparison, granular resin B had an average particle size of 0.018 inches and a Ti residue of 14.6 ppm. The resins were compounded on a Banbury unit. The bubble stability of the resins is measured in terms of the ability to produce a 1 mil film on a 50 mm Alpine extruder equipped with a 100 mm due (1 mm die gap) at an output rate of 120 lbs/hr, BUR of 4 and neck height of 28 inches. The resin characteristics and processabilities were as follows:

| Property | Resin A | Resin B |
| --- | --- | --- |
| Catalyst | Example 3 in U.S. Pat. No. 5,332,706 | Example 2 |
| FI | 8.0 | 7.1 |
| MFR | 154 | 108 |
| Base resin rheology: | | |
| Viscosity @ 0.1 1/sec., 100,000 poises | 11.8 | 9.5 |

-continued

| Property | Resin A | Resin B |
| --- | --- | --- |
| Elasticity (G'/G") @ 1.1 sec$^{-1}$ | .61 | .51 |
| Is (G'/G")0.1 < (10$^{-7}$ × V0.1) + 0.44 | No | Yes |
| Produce 1 mil film @ 120 lbs/hr | No | Yes |

The invention resin B had good bubble stability and lower elasticity compared to the resin produced with the prior art catalyst.

Example 5

The films produced from the invention resins possessed excellent properties as illustrated in this example. The resin was produced in the fluid bed reactor under the following conditions: reactor temperature 90° C., $P_E$ 189 psig, iC5/C2=0.17, H2/C2=0.011, C6=/C2=0.013, TMA 218 ppm and a residence time of 3–3.5 hours. The catalyst based on the Example 1 synthesis of the Ti component was formed with the alcohol addition step. The FI and MFR of the resin was 6.6 and 110, respectively. The base resin elasticity and viscosity at 0.1 sec-1 were 0.53 and 10$^6$ poises, respectively. The film was blown on the Alpine extruder at 120 lbs/hr, 4:1 BUR, and 28 inch neck-height. The excellent bubble stability of the resin allowed us to produce film at both 1 and 0.5 mils. The film properties were as follows:

| Gauge, mils | Dart Impact, F50 g | MD/TD Elmendorf Tear, g/mil |
| --- | --- | --- |
| 1.0 | 444 | 26/206 |
| 0.5 | 426 | 20/60 |

Thus it is apparent that there has been provided, in accordance with the invention, a product that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A product in the form of particles, characterized by a weight average particle diameter in the range of 0.01 to 0.04 inches, each particle comprising a resin which is selected from the group consisting of homopolymer or copolymer of ethylene,
   wherein the resin has a density of 0.89 to 0.97; has a Mw/Mn of 2.5 to 60, and has FI of 1 to 100, wherein said resin comprises two components of different molecular weight, wherein one of said two components is a high molecular weight component (HMW) and wherein another of said two components is a low molecular weight component (LMW) with a molecular weight less than that of HMW;
   wherein the LMW component is produced by a metallocene transition metal catalyst component and has a narrower molecular weight distribution than the HMW component which is produced by a nonmetallocene transition metal catalyst component;
   wherein the resin is formed in situ in a single reactor by a catalyst comprising a source of a metallocene transition metal;

wherein the resin has dynamic theological properties which satisfy the following equation:

Elasticity (G'/G") @ 0.1 sec$^{-1}$<0.44+10$^{-7}$−(viscosity @ 0.1 sec).

2. The product of claim 1, wherein the resin has a density which ranges from 0.930 to 0.970 g/cc.

3. The product of claim 1, wherein the resin has a specific density which ranges from 0.940 to 0.970.

4. The product of claim 1, wherein the resin has a specific density which ranges from 0.930 to 0.940.

5. The product of claim 1, wherein the Mw/Mn ranges from 10 to 40.

6. The product of claim 1, wherein the Mw/Mn ranges from 15 to 30.

7. The product of claim 1, which is crosslinkable.

8. The product of claim 1 which is a homopolymer of ethylene.

9. The product of claim 1 which is a copolymer of ethylene and an alpha olefin of 3 to 10 carbon atoms.

10. The product of claim 1 which is a copolymer of ethylene and an alpha olefin of 4 to 8 carbon atoms.

11. The product of claim 1 which is a copolymer of ethylene and an alpha olefin which is selected from the group consisting of propylene, 1-butene, 1-hexene, 1-octene, 4-methyl-pentene and admixtures thereof.

12. The product of claim 1 which is a copolymer of ethylene and 1-hexene.

13. The product of claim 12, wherein 0 to 20 weight percent of alpha olefin pf 4 to 8 carbon atoms.

14. The product of claim 1 wherein the resin contains 0.1 to 10 ppm of transition metal provided by said source of a metallocene transition metal.

15. The product of claim 1, wherein the resin has a specific density in the range of 0.918 to 0.929.

16. The product of claim 1, wherein the low molecular weight component is characterized by $M_w/M_n$ of less than 3.

17. The product of claim 16, wherein the high molecular weight components characterized by $M_w/M_n$ of greater than 3.

18. The product of claim 17, wherein the resin contains 1 to 30 ppm titanium.

19. The product of claim 1, wherein the high molecular weight components characterized by $M_w/M_n$ of greater than 3.

20. A product in the form of particles, characterized by a weight average particle diameter in the range of 0.01 to 0.04 inches, each particle comprising a resin which is selected from the group consisting of homopolymer or copolymer of ethylene, wherein the resin has a density of 0.89 to 0.97; has a Mw/Mn of 2.5 to 60, and has FI of 1 to 100, wherein said resin comprises two components of different molecular weight, wherein one of said two components is a high molecular weight component (HMW) and wherein another of said two components is a low molecular weight component (LMW) with a molecular weight less than that of HMW;

wherein the LMW component is produced by a metallocene transition metal catalyst component and has a narrower molecular weight distribution than the HMW component which is produced by a non-metallocene transition metal catalyst component;

wherein the resin is formed in situ in a single reactor by a catalyst comprising a source of a metallocene transition metal supported on a porous, particulate carrier which further comprises a non-metallocene transition metal component, wherein the carrier is formed by providing a support which contains hydroxyl groups; contacting the support with RmMgR'n where each of R and R' is an alkyl of 1 to 12 carbon atoms, and m and n are each 0, 1, or 2 providing that m+n=the valence of Mg; wherein the amount magnesium compound is sufficient to provide a Mg:OH ratio which is 0.5:1 to about 4:1 and wherein the Mg contacted support is then treated with ROH wherein ROH is used in an amount to satisfy the ROH:Mg of 0.5 to 2.0;

wherein the resin has dynamic rheological properties which satisfy the following equation:

Elasticity (G'/G") @ 0.1 sec$^{-1}$<0.44+10$^{-7}$×(viscosity @ 0.1 sec).

21. The product of claim 20, wherein the resin has a density which ranges from 0.930 to 0.970 g/cc.

22. The product of claim 20, wherein the resin has a specific density which ranges from 0.940 to 0.970.

23. The product of claim 20, wherein the resin has a specific density which ranges from 0.930 to 0.940.

24. The product of claim 20, wherein the Mw/Mn ranges from 10 to 40.

25. The product of claim 20, wherein the Mw/Mn ranges from 15 to 30.

26. The product of claim 20, which is crosslinkable.

27. The product of claim 20 which is a homopolymer of ethylene.

28. The product of claim 20 which is a copolymer of ethylene and an alpha olefin of 3 to 10 carbon atoms.

29. The product of claim 20 which is a copolymer of ethylene and an alpha olefin of 4 to 8 carbon atoms.

30. The product of claim 20 which is a copolymer of ethylene and an alpha olefin which is selected from the group consisting of propylene, 1-butene, 1-hexene, 1-octene, 4-methyl-pentene and admixtures thereof.

31. The product of claim 20 which is a copolymer of ethylene and 1-hexene.

32. The product of claim 31, wherein 0 to 20 weight percent of alpha olefin pf 4 to 8 carbon atoms.

33. The product of claim 20 wherein the resin contains 0.1 to 10 ppm of said metallocene transition metal.

34. The product of claim 20, wherein the resin has a specific density in the range of 0.918 to 0.929.

35. The product of claim 20, wherein the low molecular weight component is characterized by $M_w/M_n$ of less than 3.

36. The product of claim 35, wherein the high molecular weight components characterized by $M_w/M_n$ of greater than 3.

37. The product of claim 36, wherein the resin contains 1 to 30 ppm titanium.

38. The product of claim 20, wherein the high molecular weight components characterized by $M_w/M_n$ of greater than 3.

39. A blown film formed from the product of claim 20 having a thickness less than 1.1 mils at an output rate of greater than 100 lbs/hr in a high stalk configuration.

40. Blow molded articles formed from the product of claim 20.

41. Articles extruded from the product of claim 20.

* * * * *

UNITED STATES PATENT AND TRADEMARK OFFICE
CERTIFICATE OF CORRECTION

PATENT NO. : 5,882,750
DATED : March 16, 1999
INVENTOR(S) : Robert I. Mink, et al.

It is certified that error appears in the above-identified patent and that said Letters Patent is hereby corrected as shown below:

In column 13, line 4, add at the end before the closed parenthesis " -1 ".
In column 14, line 16, add at the end before the closed parenthesis " -1 ".

Signed and Sealed this

Seventh Day of March, 2000

Attest:

Attesting Officer

Q. TODD DICKINSON

Commissioner of Patents and Trademarks